United States Patent [19]
Modica et al.

[11] Patent Number: 5,944,869
[45] Date of Patent: Aug. 31, 1999

[54] METHOD FOR THE RECOVERY OF LEAD FROM EXHAUSTED LEAD ACID STORAGE BATTERIES

[75] Inventors: Giovanni Modica, Via G.B. Brocchi 24 20131, Milan; Roberto Nannicini, Ispra, both of Italy

[73] Assignees: Ente per le nuove technologie, l'energia e l'ambiente (ENEA), Rome; Giovanni Modica, Milan, both of Italy

[21] Appl. No.: 08/874,542

[22] Filed: Jun. 13, 1997

[30] Foreign Application Priority Data

Jun. 14, 1996 [IT] Italy ................................ RM96A0423
May 12, 1997 [IT] Italy ................................ RM97A0276

[51] Int. Cl.⁶ .................................................... C22B 13/00
[52] U.S. Cl. ................................ 75/432; 75/695; 75/725; 429/49
[58] Field of Search .............................. 429/49; 75/725, 75/432, 420, 695

[56] References Cited

U.S. PATENT DOCUMENTS

| 4,222,769 | 9/1980 | Okuda et al. . |
| 5,211,818 | 5/1993 | Moure, Jr. ................................. 75/725 |

FOREIGN PATENT DOCUMENTS

| 0038366 | 10/1981 | European Pat. Off. . |
| 0508960 | 10/1992 | European Pat. Off. . |
| 0594470 | 4/1994 | European Pat. Off. . |
| 2600384 | 7/1976 | Germany ................................ 75/695 |
| 2856330 | 7/1979 | Germany ................................ 75/695 |

OTHER PUBLICATIONS

Fisher, Dr.–Ing. H., et al., "Hydrometallurgische Aufarbeitung bleisulfathaltiger Vorstoffe," *Metall* 34–8:716–721 (1980).

*Primary Examiner*—Melvyn Andrews
*Attorney, Agent, or Firm*—Browdy and Neimark

[57] ABSTRACT

An improved method for the recovery of lead from exhausted lead-acid storage batteries, comprising removal from the storage battery of the sulphuric acid solution, the coating element, the separators between the electrodes and the metal part i.e. grids, connectors and poles and milling of the remaining electrode paste of the storage battery to obtain an extremely fine powder (pastel), characterised by the following operations:

a) treatment of the resulting powder with an aqueous saline solution, with a pH of between 0 and 8, capable of solubilising Pb (II) sulphate and oxide, leaving Pb (IV) oxide unsolubilised;

b) reduction to metal lead of the bivalent lead ion, present in the soluble fraction, using metal iron, preferably in slight excess with respect to the stoichiometric proportions;

c) reduction of the tetravalent lead oxide; and d) recovery of the salts used in the process step a) by elimination of the iron sulphate that has formed. FIG. 1 is a block diagram showing an embodiment of the present method for recovery of lead from exhausted lead acid storage batteries.

20 Claims, 4 Drawing Sheets

FIG. 1  HYDROMETALLURGICAL EMBODIMENT

METHOD FOR THE RECOVERY OF LEAD FROM EXHAUSTED LEAD ACID STORAGE BATTERIES

BACKGROUND OF THE INVENTION

1. Field of the Invention

The present invention relates to an improved method for recovery of lead, in its elementary form, that is to say in the form of metal, from lead compounds present in an exhausted lead-acid storage battery.

2. Description of the Prior Art

The improved method according to the present invention is based on a series of redox reactions between the lead oxides and sulphate with metallic iron. Thanks to these reactions the lead components are reduced to an oxidation state of zero, whereas the iron is oxidised to oxidation state 2 and 3. It is known that storage batteries, or secondary cells, have the ability to store electric energy, transforming it into chemical energy during charging and returning it, by means of inverse transformation, during discharge.

During discharge the storage battery acts as a battery in which a redox reaction takes place, and during charging it acts as an electrolyte cell in which the opposite redox reaction takes place.

The reactions that take place on the electrodes during discharge are the following:

on the positive electrode (cathode) $PbO_2 + 3H_3O^+ + HSO_4^- + 2e^- \rightarrow PbSO_4 + 5H_2O$ on the negative electrode (anode) $Pb + HSO_4^- + H_2O \rightarrow PbSO_4 + H_3O^+ + 2e^-$ global reaction $PbO_2 + Pb + 2H_2SO_4 \rightarrow 2PbSO_4 + H_2O$
$E_o = 2.2V$ When charging, the reactions are inverted, to give $2PbSO_4 + 2H_2O \rightarrow PbO_2 + Pb + 2H_2SO_4$ In a new storage battery the active components are made up of approximately 50% of metal lead and 50% of lead dioxide $PbO_2$.

The storage battery is not susceptible to further re-charging, as the initial levels of the two components mentioned above are for the most part converted into lead sulphate in an electro-chemically irreversible manner.

In these conditions both the types of oxidised lead are present both on the electrodes and in the acid sludge resulting from the destructive processes that occur in the electrolytic material during operation of the storage battery.

Exhausted lead-acid storage batteries, which until recently were considered a dangerous source of pollution due to the presence of lead compounds and sulphuric acid, are now an important source of lead metal, especially when considering the progressive exhaustion of the mineral resources relating to this metal.

Increasingly restrictive legislation for the control of pollution have enforced complete recovery of the lead compounds found in these batteries. In Italy alone, 150 thousand tons these compounds are recovered every year. This figure corresponds to approximately 94% of the total number of exhausted storage batteries.

It is known that the current state of evolution of technology relating to the recovery of lead from exhausted storage batteries, in Italy for example, exclusively involves the use of pyrometallurgic processes. However, the use of these processes is unsatisfactory, both from an economic and from an ecological point of view. They are in fact processes that operate at high temperature directly on the lead compounds in the storage batteries. This technological need to operate at temperatures in the order of 1200–1400° C inevitably results in the formation of sulphur and sulphuric dioxide, the emission of lead vapours that are both difficult and expensive to reduce, and the formation of lead chloride by interaction with chlorinated plastic materials that are present in the form of waste coating elements.

In this brief summary of the state of the art, it is also necessary to mention that the methods—for recovery of lead from exhausted lead-acid storage batteries—based on electrolytic processes have been abandoned because of their excessively high costs, in spite of the fact that they resulted in very low emission levels.

There is therefore a need in this specific field for a new method for recovery of lead from exhausted lead-acid storage batteries, that is both simple and versatile from a technological point of view, low in cost and non-polluting.

This need is completely satisfied by the new method according to the present invention, which also involves additional advantages which will be made clear in the following.

SUMMARY OF THE INVENTION

Generally speaking, the improved method according to the invention for the recovery of lead from exhausted lead-acid storage batteries, comprising removal from the storage battery of the sulphuric acid solution, the coating element, the separators between the electrodes and the metal part, i.e. grids, connectors and poles, and milling of the remaining electrode paste of the storage battery to obtain an extremely fine powder (pastel) is characterised by combination of the following operations:

a) treatment of the resulting powder with an aqueous saline solution, with a pH of between 0 and 8, capable of solubilising Pb (II) sulphate and oxide, leaving Pb (IV) oxide unsolubilised;

b) reduction to lead metal of the bivalent lead ion, present in the soluble fraction, using iron metal, preferably in slight excess with respect to the stoichiometric proportions;

c) reduction of the tetravalent lead oxide; and d) recovery of the salts used in the process step a) by elimination of the iron sulphate that has formed.

Solubilisation of the Pb (II) sulphate and oxide in process step a) can be obtained with an aqueous solution of a salt selected from the group comprising ammonium, potassium, sodium acetates, ammonium, potassium, sodium tartrates, ammonium chloride, ammonium sulphate, ammonium nitrate, sodium chloride, acid salified or unsalified monoethanolamine, acid salified or unsalified diethanolamine, acid salified or unsalified triethanolamine, acid salified or unsalified diethylentriamine, ethylenediaminotetracetic acid disodium salt, ammonium, potassium or sodium glycolates.

Reduction of the bivalent lead ion, present in the soluble fraction, during the process step b) can take place at any temperature up to the boiling point, preferably between 70° C. and boiling point, optionally under stirring.

In a first embodiment, the tetravalent lead oxide in step c) is reduced to bivalent lead oxide, which is fed into process stage b).

Reduction of the tetravalent lead oxide present in the insoluble fraction, during the process step c), can be obtained by heat treatment at 650–700° C. to give bivalent lead oxide, which is then input into the process step a). (The temperature of this treatment is relatively low and a long way from the decomposition temperature of the lead sulphate that may be present as a residue, so that generally speaking there is no emission of harmful gases or vapours).

Alternatively, reduction of the tetravalent lead oxide present in the insoluble fraction in the process step c) can take place by treatment with a solution of bivalent iron salt to give a solution containing bivalent lead oxide and trivalent iron ion, which is input into the process step b).

Removal of the ferrous sulphate, in the process step d), can be obtained by an alkalising treatment. This alkalising treatment can be obtained preferably by addition of an hydroxide selected from the group comprising sodium, potassium, calcium, ammonium and barium hydroxide and combinations thereof. In this case, separation of the ferrous hydroxide from the other solids can be achieved by the difference in specific weight.

The present invention is not limited to the improved method for recovery of lead from exhausted lead-acid batteries, but also extends to the high purity ferrous hydroxide obtained from the first embodiment of the new method described above.

The aqueous treatment solution used in the process step a) must have a pH value of between 0 and 8 and must be brought to within this range of values if the pH of the treatment solution is found to differ therefrom.

The solutions leaving the treatment areas foreseen in process steps a) and b) contain ions of the solubilising solutions, and are poor in $Pb^{++}$ ions and rich in $Fe^{++}$ and $Fe^{+3}$ ions. They contain sulphate ions previously bound to the lead sulphate. If these solutions are to be re-cycled to the paste solubilisation stage, it is necessary to eliminate either totally or in part the sulphate ions, so that they do not accumulate and inhibit the solubilisation process. Likewise, it is necessary to eliminate the ferrous or ferric ions if these have not already been precipitated as hydroxide. Their concentration in the solution depends on the pH at which the lead reduction operation has been carried out. At a pH of over 3.5–4, the iron (III) is all precipitated in the form of insoluble ferric hydroxide. On the contrary the iron (II) is fairly soluble even in the form of hydroxide, but it can easily be converted into iron (III) hydroxide by blowing in air.

The concentration of ferric ions depends on the pH of the solution. If the solution leaving the treatment areas involving the use of metallic iron has a low pH (under 3) it is possible to proceed to "total" elimination of the ferric ions by precipitating them in the form of iron hydroxide, raising the pH of the solution to a level of 5.5–6 by a moderate addition of the alkali that will subsequently be used to precipitate the sulphate ions.

Precipitation of the ferric hydroxide is selective because of its extremely low solubility. The conditions in which precipitation occur are a long way from those in which the sulphate ion salts and the lead (II) salts precipitate, so that the product obtained does not contain the above ions. Simultaneously to the addition of alkalis it is possible to pass a current of air or oxygen through the solution so as to oxidise the $Fe^{+2}$ ions to $Fe^{+3}$ and precipitate them in the form of iron (III) hydroxide.

The sulphate ions can be eliminated from the solution by treatment with compounds whose cations bind to the sulphate ions to form low-solubility sulphates. The compounds preferred for this treatment are sodium hydroxide, potassium hydroxide, calcium hydroxide, ammonium hydroxide or barium hydroxide.

Treatment with sodium or potassium hydroxide results in partial elimination of the sulphates, as the sodium or potassium sulphate is fairly soluble in water. The products obtained have a certain market value.

Treatment with calcium hydroxide results in formation of the respective sulphate, which has a low market value; however it leaves a sulphate residue in the order of 2 g/l.

Treatment with ammonium hydroxide results in formation of ammonium sulphate, a product used as a nitrogenous fertiliser. Separation of this salt can be achieved after concentration of the solution and fractionated crystallisation of its components.

Treatment with barium hydroxide or carbonate results in total elimination of the sulphates, as barium sulphate is one of the salts with the lowest solubility level. However it is necessary to take into account the cost of barium salts and the relatively low value of barium sulphate itself.

Treatment for elimination of the sulphates from the solution, a problem that is common to all processes for the recovery of lead from exhausted storage batteries, must be evaluated on the basis of market request and the ease with which the resulting sulphate can be placed.

The other reaction by-product, ferric hydroxide, has a good market value. It is a product with a high level of purity which can easily be re-sold to the fields of iron and steel metallurgy, pigments for paints, colours and plastic materials.

The embodiment of the present invention that foresees reduction of the tetravalent lead oxide to bivalent lead using the ferrous ions, however, has not proved entirely satisfactory from an economic point of view, due to the fact that it is impossible to ensure an appropriate control on it as it is carried out. This important limitation is substantially due to the presence of two process steps in which the respective reactions proceed with different kinetics and with reagents in a two-phase system (solid and liquid). These steps are the step of reduction of the bivalent lead ion with metal iron and the step of reduction of the lead dioxide with the ferrous ions produced in the preceding step.

To overcome this disadvantage the reduction of tetravalent lead oxide can be carried out by combining the following operations:

uniting the solids separated in steps a) and b), essentially comprising all the lead (IV) oxide, possibly a part of lead (II) oxide, metal lead in a pulverous state and the excess of metal iron;

mixing the solids united in this way with solid, liquid and/or gaseous reducing agents;

treating the mixture obtained in this way, at a temperature comprised between 400 and 1300° C., optionally under stirring, to form molten metal lead in the presence of a small amount of slag and without the emission of sulphurous and sulphuric gases.

In this embodiment (hereinafter also indicated as the hydropyrometallurgy variant) of the present invention, the solid, liquid and/or gaseous reducing agents can be selected from the group comprising coal, coke, solid and liquid hydrocarbons, carbon monoxide and hydrogen. Treatment of the mixture to form the molten metal lead in the presence of small amounts of slag and without emission of sulphurous and sulphuric gasses can take place preferably at temperatures of between 700 and 1100° C. over a period of time of between 15 minutes and 1 hour, for preference between 20 minutes and 50 minutes.

Elimination of the ferrous sulphate, in order to recover the salts used in step a), can be obtained by an operation selected from the group comprising the addition of hydroxide, carbonate or bicarbonate of alkaline or alkaline-earth metal, or concentration of the solution, crystallisation and separation of the ferrous sulphate.

An important advantage of the hydropyrometallurgy variant of the present invention is that founding of the metal lead in the pulverous state takes place simultaneously to reduction of the lead (II and IV) oxides. In this way the bivalent lead oxide that is formed during manipulation of this pulverous lead (which is extremely reactive and tends to oxidise easily, even at room temperature, to form bivalent lead oxide) is reduced to metal lead.

It must be considered that the pulverous lead produced in step b) must in any case be melted down in a cupel in order to undergo refining and alligation processes, so that the passage in the pyrometallurgy stage involves a small expenditure of energy, which is compensated however by recovery of the oxidised fraction. It is preferred to carry out the pyrometallurgy treatment in the presence of a small amount of metal iron, as the paste does not represent a mixture of pure substances, but a mixture of substances that may contain sulphates of other metals. In this case the presence of the iron serves to move the sulphate anion, to free these metals and allow them to be recovered.

The hydropyrometallurgy variant of the present invention shows, with respect to traditional processes for heat reduction of all the pastel, a number of advantages both from an energy and from an environmental point of view.

From the energy point of view, in a typical industrial process for heat reduction of the paste, carried out in a discontinuous rotating furnace, the balance of matter and energy is, on average, as follows:

| pastel (*) | 1000 Kg | temperature 1100–1200° C. |
|---|---|---|
| coal | 60 Kg | time 4–4.5 hours |
| iron | 120 Kg | total energy 244 $Nm^3$ of $CH_4$ |
| $Na_2CO_3$ | 40 Kg | |
| glass | 2 Kg | |
| (*) average composition of the pastel: | | |
| $PbSO_4$ | 52.39 | metallic Pb | 3.46% |
| $PbO_2$ | 17.66% | humidity | 0.4% |
| PbO | 15.76% | inert matter | 8.24% |
| others | 2.09% | total lead | 68.71% |
| (Fe, As, Sb, etc.) | | recoverable | |

When calculating the ratio of the above values to one kilogram of lead that can in theory be recovered from the pastel by heat reduction, carried out in the conditions indicated above, the following values are obtained:

| coal | 0.0873 Kg/Kg Pb |
|---|---|
| iron | 0.174 Kg/Kg Pb |
| $Na_2CO_3$ | 0.058 Kg/Kg Pb |
| glass | 0.003 Kg/Kg Pb |
| energy ($CH_4$) | 0.35 $Nm^3$/Kg Pb |

The balance of matter and energy for the mixed hydropyrometallurgy process subject of the present invention, always carried out on the same type of pastel, with the lead sulphate reduced in the hydrometallurgy section, all the oxides (II and IV) reduced in the pyrometallurgy section and all the lead produced in step b) reduced to a molten condition in the same section, are:

| iron | 0.139 Kg/Kg Pb |
|---|---|
| lime | 0.185 Kg/Kg Pb |
| coal | 0.037 Kg/Kg Pb |
| energy ($CH_4$) | 0.10 $Nm^3$/Kg Pb |

Comparison of the two balances underlines the economic and energy saving that can be obtained using the present invention. This saving results from a whole series of positive causes, which can be summarised as follows:

in the hydrometallurgy stage of the method according to the present invention all the lead sulphate is treated, amounting to over 50% by weight of the pastel, with a minimum expenditure of energy as the reaction is carried out at a low temperature, for example 80° C.;

in the heat stage of the method the lead produced in the hydrometallurgy section is melted down, an operation requiring a minimum energy expenditure as this element has a low specific heat (0.038 cal/g °C.) [1], and the lead (II)oxide is reduced, as the lead (IV) oxide, when heated, without the addition of any reducing agent, to a temperature of over 510–640° C. [2], spontaneously releases oxygen, reducing itself to lead (II) oxide. This oxide can be reduced both quickly and easily to metal, using coal, CO, hydrogen and hydrocarbons, at a temperature of between 300 and 600° C. depending on the type of reducing agent being employed [3–4]. This gives further noticeable advantages from an energy saving point of view, both due to the low reaction temperature and due to the low speed of the reaction itself. During treatment of the pastel, as the latter is made up of non-pure products containing a high level of impurities, it is necessary to work at higher temperatures to encourage formation of waste products that contain these impurities.

The optimum treatment temperature is between 700 and 1100° C. The reduction reaction involves approximately 35% of the initial mass of the pastel, and this results in a further reduction of the heat necessary to bring the product up to the optimum reaction temperature;

in the heat stage there is no treatment of the lead sulphate, a product that in order to be converted into metal lead requires the presence of a large excess of iron, necessary to transfer the sulphate anion, and long contact periods with high reaction temperatures.

From an environmental point of view, the advantages of the method according to the present invention can be summarised as follows:

elimination of the emissions of sulphurous and/or sulphuric gas connected with the reaction of lead sulphate at high temperature;

lower emission of carbon dioxide, as the method according to the present invention requires lower amounts of energy;

drastic reduction of the production of waste, as the consumption on both sodium carbonate and glass is reduced to a negligible amount.

Use of the hydropyrometallurgy variant of the present invention by companies involved in the recovery of lead from pastel by means of pyrometallurgy processes does not involve heavy investments, as the existing pyrometallurgy section in this type of plant is perfectly suitable for treatment of the mixture of lead (II) and (IV) oxides, while the hydrometallurgy section is made up of a dissolving device, a reduction reactor and a neutralisation reactor, as well as three liquid-solid separation sections which can be created using filters and/or centrifuges and/or gravitational sedimentation units.

When comparing the mass-energy balance of the hydropyrometallurgy variant of the present invention, and the embodiment described previously (hydro variant), again referring to the same type of pastel, the following results are found:

TABLE 2

| | hydro variant | hydropyrometallurgy variant | |
|---|---|---|---|
| Fe | 0.33 | 0.139 | Kg/Kg Pb |
| Ca $(OH)_2$ | 0.44 | 0.185 | Kg/Kg Pb |
| $H_2SO_4$ 10% | 2.23 | | l/Kg Pb |

TABLE 2-continued

|  | hydro variant | hydropyrometallurgy variant |  |
|---|---|---|---|
| coal |  | 0.037 | Kg/Kg Pb |
| energy | 0.06 | 0.10 | Nm³CH₄/Kg Pb |

From analysis of the balance, it is still found to be more convenient to use the hydropyrometallurgy version, as the amount of reducing agent to be used, whether coal or other reducing agent, is very small.

The higher energy consumption is amply compensated by a lower consumption of reactive agents, in particular iron and lime.

The economic advantages that can be obtained using the hydropyrometallurgy version according to the invention will be still more evident when comparing the prices of producing one Kg of lead. These prices do not take into account labour costs, plant amortisation and the like, but merely the costs of raw materials and energy.

TABLE 3

| raw materials + energy | cost Lire/Kg Lire/m³ | PYRO Kg/Kg Pb | HYDRO Kg/Kg Pb | Invention method Kg/Kg Pb |
|---|---|---|---|---|
| coal | 150 | 0.0873 |  | 0.037 |
| iron | 180 | 0.174 | 0.33 | 0.139 |
| Na₂CO₃ | 200 | 0.058 |  |  |
| lime | 100 |  | 0.44 | 0.185 |
| glass | 50 |  |  |  |
| CH₄ | 450 | 0.35 | 0.06 | 0.10 |
| Total Lire |  | 213 | 130 | 94 |

Removal of the ferrous ions that form during the reduction process in step b) can be carried out by treating the solubilisation solution with alkalis, carbonates, bicarbonates of alkaline and/or alkaline-earth metals, preferably by means of the addition of sodium hydroxide, calcium hydroxide, ammonium hydroxide, barium hydroxide and combinations thereof, or of sodium carbonate, sodium bicarbonate, thus obtaining a ferrous hydroxide precipitate and a sulphate precipitate of the alkaline and/or alkaline-earth metal used.

Alternatively, it is possible to proceed to concentration of the solution and fractionated crystallisation of the ferrous sulphate and the solubilising compound to be recycled to step a) of the method.

In this case using the present method it is possible to obtain a second compound, ferrous sulphate, with a high level of purity, that can be positioned on the market, for example in the field of waste water treatment or that of additives for fertilisers.

Up to this point a description of a general nature has been given of the method according to the present invention. With the aid of the figures and examples enclosed, a more detailed description of specific embodiments of the invention will now be given, with the purpose of giving a clearer understanding of the objects, advantages, characteristics and operating methods thereof.

BREIF DESCRIPTION OF THE DRAWINGS

DETAILED DESCRIPTION OF THE INVENTION

EXAMPLE 1

Figure 1:
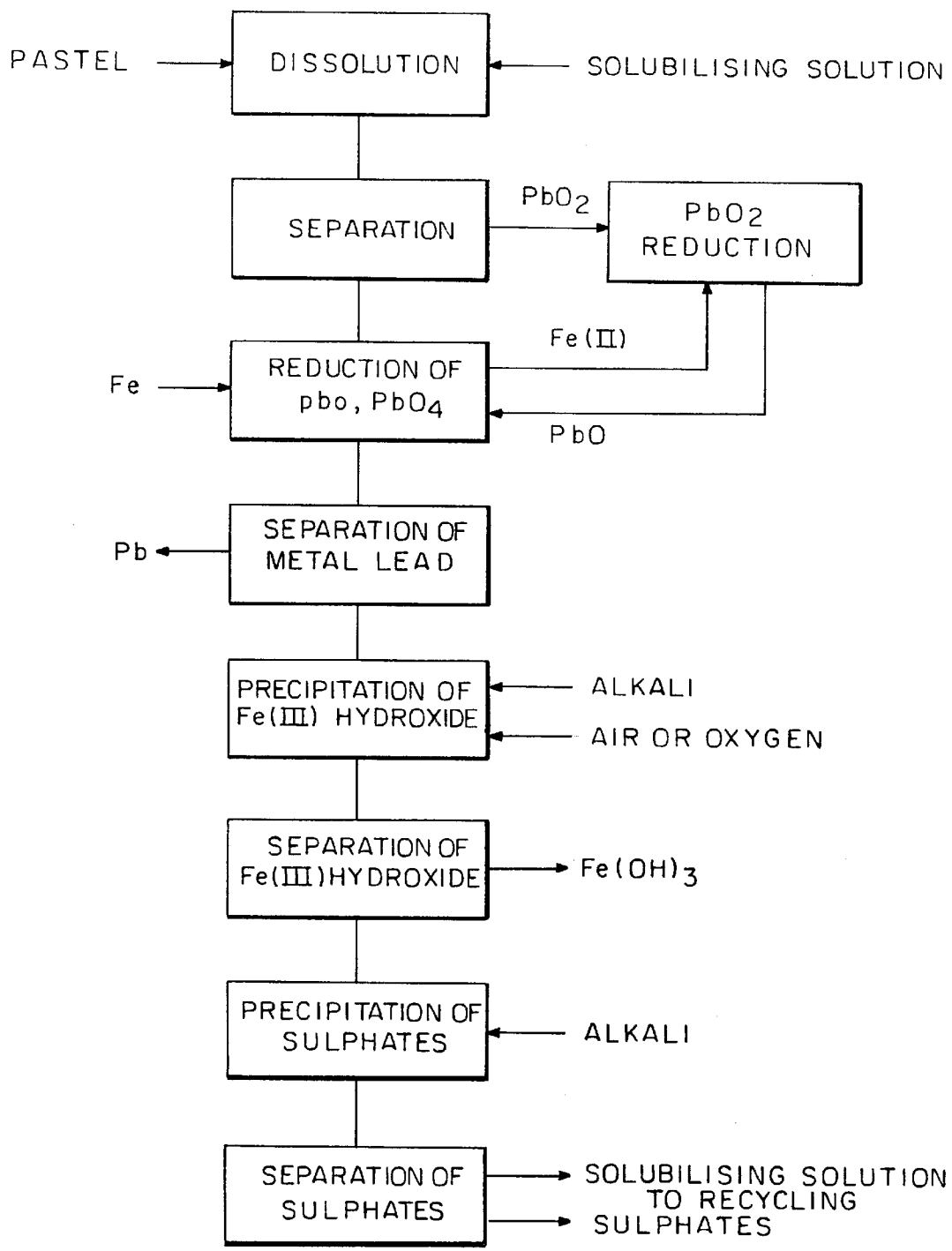
FIG. 1 shows a block diagram of a hydrometallurgy method according to the present invention.
Figure 2:
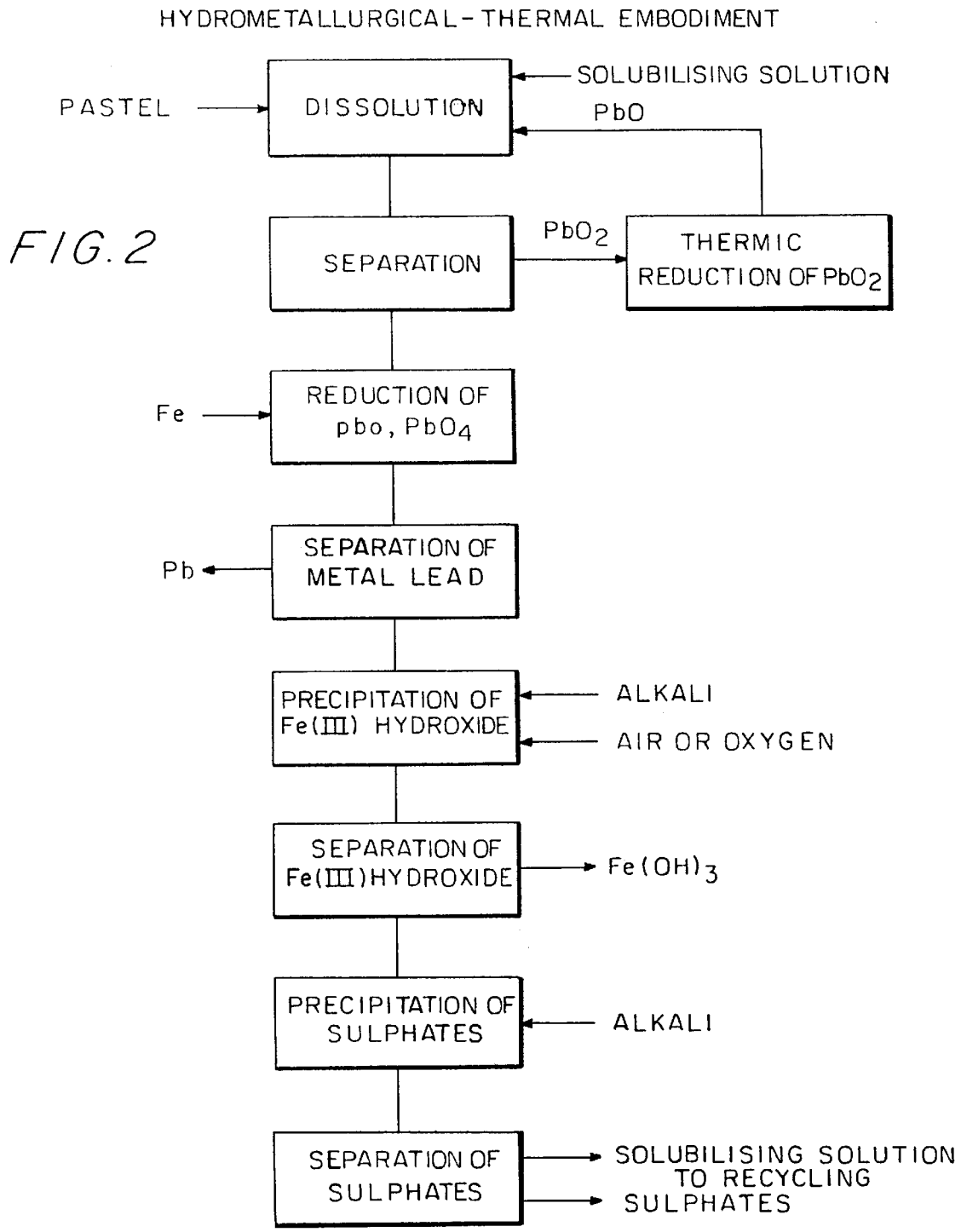
FIG. 2 shows a block diagram of a hydrometallurgical and thermal treatment method according to the present invention.
Figure 3:
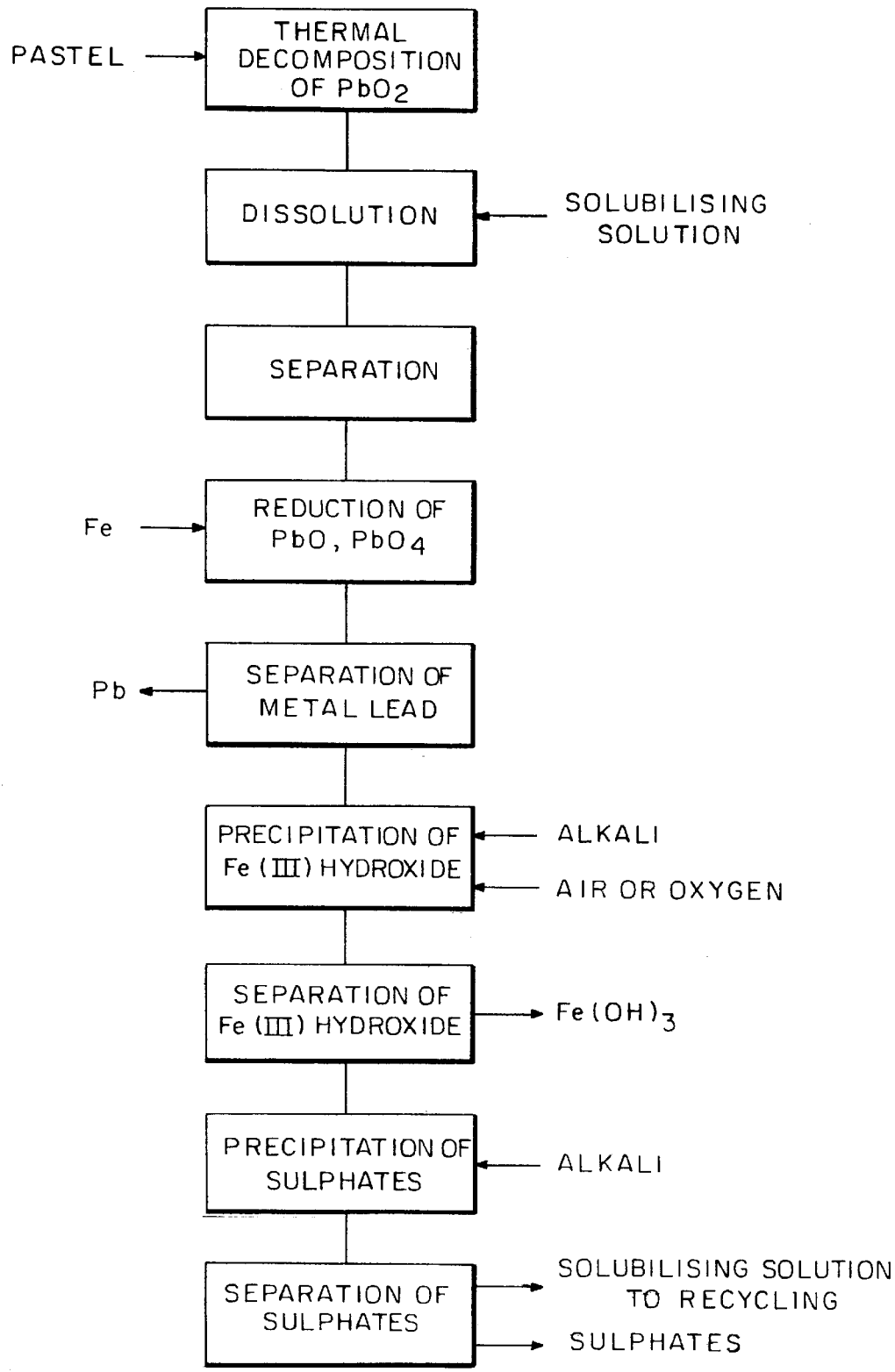
FIG. 3 shows a block diagram of a further embodiment of the method according to the present invention.
Figure 4:
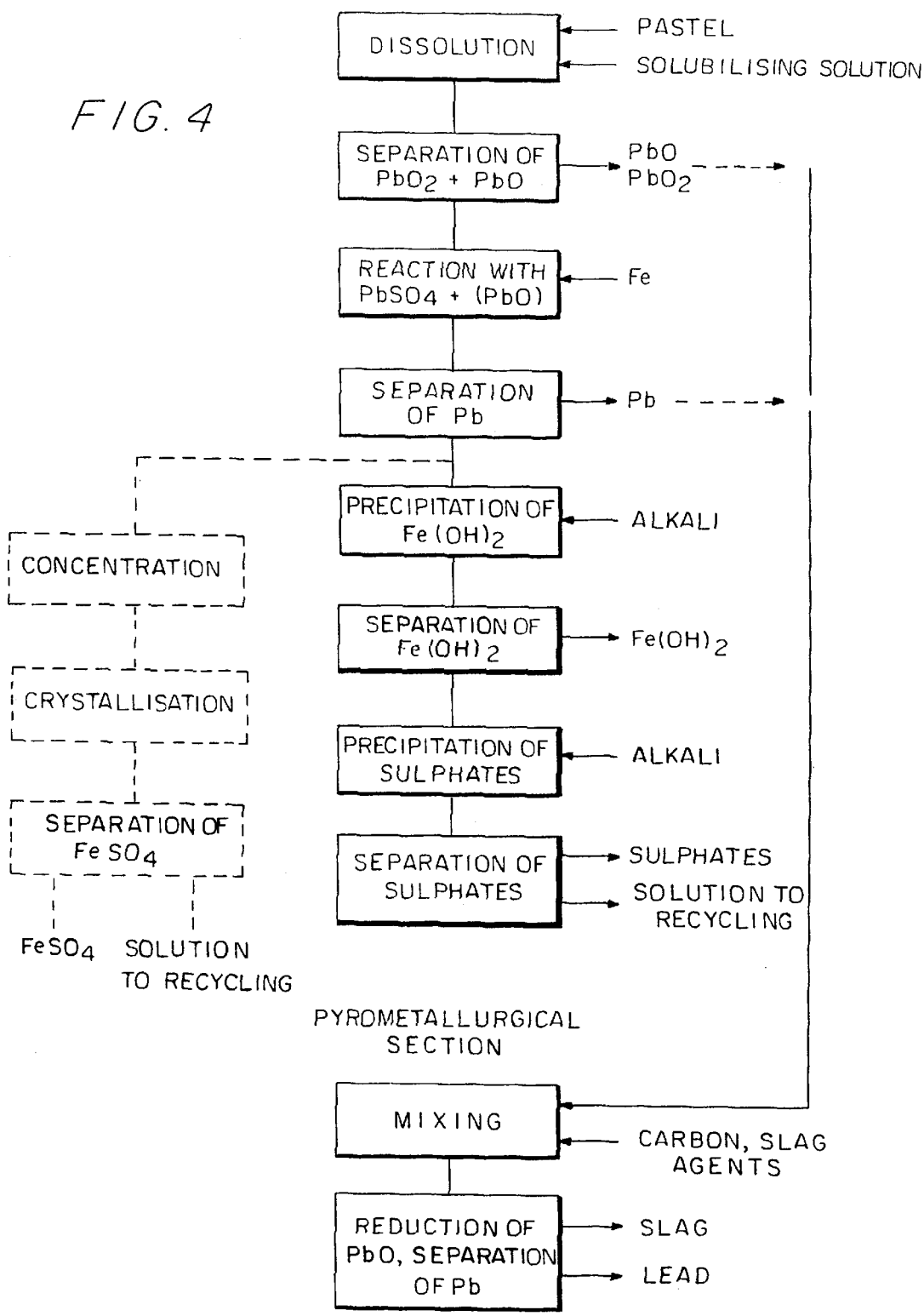
FIG. 4 shows a block diagram of a hydropyrometallurgy variant of the present invention, used in the following example 6.

50 grams of powder obtained by milling the lead-based elements from a battery, this powder being commonly known as paste, were placed in a balloon flask and suspended in 500 ml of water.

The centesimal composition of this powder is as follows:

|  | ponderal | molar (1000 g) |
|---|---|---|
| Pb sulphate | 60% | 1.98 |
| Pb (II)oxide | 20% | 0.896 |
| Pb (IV)oxide | 20% | 0.836 |
|  | 100% | 3.712 |

100 grams of iron, in the form of iron rods with a diameter of 2 mm and an average length of 15–20 mm, were placed in a second balloon flask. To the second balloon flask were added 500 ml of water and 100 g of sodium acetate. The contents of the two balloon flasks was brought up to a temperature of 80° C. while a two channel peristaltic pump provided for continuous transfer of the solution from the first balloon flask to the second and vice versa. An amount of sodium acetate sufficient to bring the pH of the solution to 5–5.5 was added.

At the entrance and exit of the balloon flask containing iron two filters were positioned, with the job of blocking on entrance the parts of the paste that are not dissolved, and of blocking on exit the smaller fractions of metal lead that are produced by reaction with the metal iron and the ferrous hydroxide that is formed due to oxidation of the iron.

The reaction was followed to determine the progressive disappearance of the bivalent lead ions from the solution, and after 4 hours they were found to be greatly reduced.

Simultaneously, shiny masses of metal lead are formed in contact with the metal iron, and these progressively collect and separate to the bottom of the balloon.

At the end of the reaction, a red coloured precipitate, made up of ferric hydroxide, was recovered from the filters, the metal lead was separated from the iron and both were weighed.

The aqueous phase was treated with sodium hydroxide until reaching pH 5.5–6 and simultaneously air was blown into it, obtaining the dual effect of oxidising the residual ferrous ions to form ferric ions and of precipitating them as ferric hydroxide, which was separated off from the solution by means of filtration. After separation of the ferric hydroxide, the solution was additioned with further sodium hydroxide and brought down to room temperature so as to facilitate separation of the sodium sulphate.

The liquid phase, after correction of the pH to a value of 5.4, was used for a new treatment cycle of the pastel in the same conditions described above, obtaining results that were sufficiently similar in terms of lead recovery and metal iron consumption levels.

This operation was repeated 5 times, obtaining sufficiently similar results in terms of lead recovery, iron consumption and sodium sulphate recovery for each cycle.

The mass balances of the reactions described in this and the following examples are summarised in Table 1.

EXAMPLE 2

50 grams of powder, having the same composition as the powder described in example 1, obtained by milling the lead-based elements of a battery, were treated in the same apparatus described in example 1.

The volumes of water used were the same, whereas 100 g of ammonium acetate were used as a solubilising agent. The initial pH of the solution was lowered to 2 by addition of acetic acid. The temperature of the test was 70° C. and the duration 2 hours.

At the end of the reaction, only metal lead was recovered as a solid, as the ferric and ferrous ions are all present in the solution.

The solution was therefore treated with sodium hydroxide until reaching pH 5.5–6 and simultaneously air was blown into it, obtaining the dual effect of oxidising the ferrous ions to form ferric ions and of precipitating them as ferric hydroxide, which was separated off from the solution by means of filtration. After separation of the ferric hydroxide, the solution was additioned with further sodium hydroxide and brought down to room temperature so as to facilitate separation of the sodium sulphate.

The liquid phase was additioned with acetic acid until reaching a pH value of 2 and was used for a new treatment cycle of the pastel in the same conditions described above.

The operation was repeated on a further 5 samples of pastel. The results obtained are summarised in Table 1.

EXAMPLE 3

The same operating conditions as example 1 were used. The solubilising agent used was 100 grams of ammonium chloride additioned with hydrochloric acid until reaching a pH value of 0, maintained at this value by means of progressive additions of acid.

The reaction temperature was 80° C. and the duration of the reaction 2 hours.

Subsequent treatment operations were similar to the ones described in example 2. The results obtained are summarised in Table 1.

EXAMPLE 4

50 grams of pastel were treated at 650° C. for 15 minutes without the addition of any reactive agent, obtaining the quantitative conversion of lead dioxide into lead oxide.

50 grams were taken from the mass and treated as described in example 1. The results obtained are summarised in Table 1.

EXAMPLE 5

A method identical to the one described in example 4 was used, with the exception that treatment of the mass was carried out as described in example 2. The results are summarised in Table 1.

Table 1 also contains the results of other tests carried out with substances other than those used in examples 1 to 5.

EXAMPLES 6–11

The results of other tests carried out, both using the substances mentioned in examples 1–5 and using other substances according to the present invention, are summarised in Table 1.

TABLE 1

RESULTS OF THE TESTS ON REDUCTION OF LEAD COMPOUNDS OBTAINED FROM EXHAUSTED LEAD-ACID BATTERIES
All tests have been carried out using the same amounts of pastel (50 grams) with the same ponderal composition: Pb sulphate 50%, Pb(II) oxide 20%, Pb(IV) oxide 20%.

| | process type | | solubilising | concentration | |
|---|---|---|---|---|---|
| Example | hydro | hydro-pyro | agent | g/l | pH |
| 1 | hydro | | Na Acetate | 100 | 5–5.5 |
| 2 | hydro | | NH$_4$ Acetate | 100 | 2 |
| 3 | hydro | | NH$_4$Cl | 100 | 0 |
| 4 | | hydro-pyro | Na Acetate | 100 | 5–5.5 |
| 5 | | hydro-pyro | NH$_4$ Acetate | 100 | 2 |
| 6 | hydro | | NH$_4$Cl | 100 | 2 |
| 7 | hydro | | NH$_4$NO$_3$ | 100 | 3 |
| 8 | hydro | | Na Glycolate | 150 | 3 |
| 9 | | hydro-pyro | Na Tartrate | 100 | 2 |
| 10 | | hydro-pyro | Triethanol-amine | 500 | 4 |
| 11 | hydro | | NH$_4$ Sulphate | 150 | 2 |

| temperature °C. | time hours | lead obtained grams | iron used grams | type of iron |
|---|---|---|---|---|
| 80 | 4 | 35.7 | 7.8 | rod 2* |
| 70 | 2 | 36.4 | 7.7 | rod 2* |
| 80 | 2 | 35.2 | 9.4 | filings |
| 80 | 4 | 36.0 | 11.2 | rod 2* |
| 70 | 2 | 37.4 | 11.8 | filings |
| 80 | 4 | 32.0 | 10.2 | filings |
| 75 | 4 | 27.0 | 9.7 | rod 2* |
| 70 | 3 | 36.0 | 8.1 | filings |
| 80 | 4 | 20.2 | 5.4 | rod 2* |
| 80 | 4 | 27.4 | 6.5 | filings |
| 75 | 3 | 15.2 | 7.3 | filings | rod 2* = iron rod diameter 2 mm
filings = iron filings thickness 0.3 mm, width 5 mm

EXAMPLE 12

1000 grams of a powder obtained by milling the lead based elements present in a battery, said powder being commonly known as pastel and having the following centesimal composition:

| PbSO$_4$ | 52.39% |
|---|---|
| PbO$_2$ | 17.66% |
| PbO | 15.76% |
| inert matter | 8.24% |
| moisture | 0.4% |
| others (Fe, As, Sb, etc.) | 2.09% |
| TOTAL LEAD RECOVERABLE | 68.71% | were placed in a reactor and treated with 2000 grams of sodium acetate dissolved in 10 liters of water at a temperature of 80° C. The solution was brought to pH 6 by addition of 10% sulphuric acid and kept under stirring for 5 minutes using a rotating paddle stirrer. The suspension was filtered to recover a solid 1, while the solution was transferred into a second reactor with a conical base, so as to facilitate separation of the solids through the difference in specific weight, and put into contact with iron metal in the form of shavings for a time of 30 minutes.

After the reaction time, two solids have formed in layers on the conical base of the reactor: the lower layer is made up of 99% pulverous lead and the remaining amount of metal iron dust, solid 2, and the upper layer is essentially made up of ferrous hydroxide. Solids 1 and 2 were joined, additioned with 26 grams of coal and with a small amount of sodium carbonate, and transferred to a porcelain crucible for treatment in a muffle furnace, heated by means of a methane burner, at a temperature of 1000° C. for 30 minutes.

At the end of this time, 684 grams of metal lead were found in the crucible, along with a small amount of waste material, evaluated at approximately 0.6% of the weight of the lead.

The solution remaining in the second reactor, after separation of solid 2, was treated with an amount of calcium hydroxide capable of completing precipitation of the iron (II) hydroxide, which was separated off by filtration.

Subsequently, further calcium hydroxide was added until obtaining precipitation of the sulphates under the form of calcium sulphate, which was likewise recovered by filtration.

The recovered filtrate, which was poor in sulphate and iron ions, was corrected to pH 6 and recycled to the first reactor. This operation was repeated 6 times, obtaining the same results in terms of lead recovery, ferrous hydroxide recovery, calcium sulphate recovery, and iron and lime consumption.

The total energy consumption when calculated in terms of methane consumption/Kg of lead produced, was calculated to be 0.10 m$^3$.

EXAMPLES 13–18

These examples are summarised in the following Table 4. All the quantities used relate to 1000 grams of pastel having the same composition as the one described in example 1. The hydrometallurgy treatment was carried out in all the examples at a temperature of 80° C. for a time of 30 minutes, as it was only necessary to proceed to reduction of the Pb (II) ions, the only reaction in the system. This time is found to be sufficient for complete reduction of the Pb (II) ions, present in the solution with iron in the form of shavings.

In the totally hydrometallurgic treatment, on the contrary, two reactions took place in the reactor: the reaction for reduction of the Pb (II) ions using the iron and the reaction for reduction of the Pb (IV) ions using the Fe (II) ions. Completion of these two reactions will also require longer reaction times.

TABLE 4

| Example | Solvent | g of solvent | temp. °C. | time, min. | % Pb recovered |
| --- | --- | --- | --- | --- | --- |
| 13 | Na Acetate | 100/litre | 1100 | 20 | 98.1 |
| 14 | NH$_4$ Acetate | 100/litre | 1000 | 40 | 98.9 |
| 15 | Na Acetate | 100/litre | 900 | 50 | 98.6 |
| 16 | NH$_4$Cl | 120/litre | 1000 | 30 | 98.8 |
| 17 | Na Acetate | 120/litre | 1100 | 30 | 99.5 |
| 18 | Na Acetate | 120/litre | 600 | 30 | 96.0 |

Methane consumption m$^3$/Kg of lead produced:

| | |
| --- | --- |
| Example 13 | 0.12 |
| Example 14 | 0.11 |
| Example 15 | 0.11 |
| Example 16 | 0.10 |
| Example 17 | 0.11 |
| Example 18 | 0.09 |

We claim:

1. An improved method for the recovery of lead from exhausted lead-acid storage batteries, comprising separating electrode paste from the storage battery and milling the separated electrode paste of the storage battery to obtain an extremely fine powder, the method further comprising:

a) treating said fine powder with an aqueous saline solution of a salt selected from the group consisting of ammonium, potassium and sodium acetates; ammonium, potassium and sodium tartrates; ammonium chloride; ammonium sulphate; ammonium nitrate; sodium chloride; acid salified or unsalified monoethanolamine; acid salified or unsalified diethanolamine; acid salified or unsalified triethanolamine; acid salified or unsalified diethylentriamine; ethyldiaminotetracetic acid disodium salt; and ammonium, potassium and sodium glycolates, with a pH between 0 and 8, capable of solubilising Pb (II) sulphate and oxide, leaving Pb (IV) oxide unsolubilised;

b) reducing Pb (II) ion from said Pb (II) sulphate and oxide to lead metal using metal iron, optionally in slight excess with respect to the stoichiometric proportions;

c) reducing the Pb (IV) oxide to Pb (II) ion; and d) recovering salts used in the process step a) by elimination of iron sulphate that has formed.

2. The improved method for recovery of lead from exhausted lead acid batteries according to claim 1, in which reduction of the tetravalent lead Pb (IV) oxide present in process step c) is obtained by treatment with a solution of bivalent iron salt to give a solution containing bivalent lead Pb (II) oxide and trivalent iron ion, which is input into process stage b).

3. The improved method for recovery of lead from exhausted lead acid batteries according to claim 1, in which reduction of the bivalent lead ion Pb (II), present in the soluble fraction, in process step b) takes place at any temperature up to the boiling point.

4. The improved method for recovery of lead from exhausted lead acid batteries according to claim 3, in which reduction of the bivalent lead ion Pb (II) present in the soluble fraction of process step b) takes place under stirring.

5. The improved method for recovery of lead from exhausted lead acid batteries according to Pb (IV) claim 4, in which the tetravalent lead Pb (II) oxide in process step c) is reduced to bivalent lead Pb (II) oxide, which is input into process step b).

6. The improved method for recovery of lead from exhausted lead acid batteries according to claim 4, in which the reduction of the tetravalent lead Pb (IV) oxide, present in process step c) is obtained by heat treatment at 650–700° C. to give bivalent lead Pb (II) oxide, which is input to process step a).

7. The improved method for recovery of lead from exhausted lead acid batteries according to claim 4, in which reduction of the tetravalent lead Pb (IV) oxide present in process step c) is obtained by treatment with a solution of bivalent iron salt to give a solution containing bivalent lead Pb (II) oxide and trivalent iron ion, which is input into process stage b).

8. The improved method for recovery of lead from exhausted lead acid batteries according to claim 1, in which removal of the iron sulphate in process step d) is achieved by an alkalising treatment.

9. The improved method for recovery of lead from exhausted lead acid batteries according to claim 8, in which the alkalising treatment is obtained by addition of an hydroxide optionally selected from the group consisting of sodium hydroxide, potassium hydroxide, calcium hydroxide, ammonium hydroxide, barium hydroxide, and combinations thereof.

10. The improved method for recovery of lead from exhausted lead acid batteries according to claim 8, in which ferric hydroxide, precipitated in step d), is separated from other solids by effect a difference in specific weight.

11. The improved method for recovery of lead from used lead acid batteries according to claim 1, in which reduction of the tetravalent lead Pb (IV) oxide in step c) is carried out by combining the following operations:

uniting the solids separated in steps a) and b), essentially comprising all the lead (IV) oxide, optionally a part of lead (II) oxide, metal lead in a pulverious state and metal iron;

mixing the solids united in this way with solid, liquid and/or gaseous reducing agents to obtain a mixture;

treating said mixture at a temperature between 400 and 1300° C., optionally under stirring for a time between 20 minutes and 1 hour, to form molten metal lead in the presence of a small amount of slag and without the emission of sulphurous and sulphuric gases; and recovering the molten metal lead, said recovery of said salt used in the process step a) being achieved by elimination of the iron sulphate.

12. The improved method for recovery of the lead from exhausted lead acid batteries according to claim 11, in which the solid, liquid and/or gaseous reducing agents are selected from the group consisting of coal, coke, solid and liquid hydrocarbons, carbon monoxide and hydrogen.

13. The improved method for recovery of the lead from exhausted lead acid batteries according to claim 11, in which the treatment temperature for the mixture is between 700 and 1100° C.

14. The improved method for recovery of the lead from exhausted lead acid batteries according to claim 13, in which the treatment time for the mixture is between 15 minutes and 1 hour.

15. The improved method for recovery of the lead from exhausted lead acid batteries according to claim 11, in which elimination of the iron sulphate, in order to recover the salts used in step a), is achieved by an operation selected from the group consisting of addition of an hydroxide, a carbonate and a bicarbonate of an alkaline or alkaline-earth metal, or by concentration of the solution, crystallisation and separation of the ferrous sulphate.

16. The method of claim 3 wherein said temperature is between 70° C. and the boiling point.

17. The improved method for recovery of lead from exhausted lead acid batteries according to claim 1, in which reduction of the bivalent lead ion Pb (II) present in the soluble fraction of process step b) takes place under stirring.

18. The improved method for recovery of lead from exhausted lead acid batteries according to claim 1, in which the tetravalent lead Pb (IV) oxide in process step c) is reduced to bivalent lead Pb (II) oxide, which is input into process step b).

19. The improved method for recovery of lead from exhausted lead acid batteries according to claim 1, in which the reduction of the tetravalent lead Pb (IV) oxide, present in process step c) is obtained by heat treatment at 650–700° C. to give bivalent lead Pb (II) oxide, which is input to process step a).

20. The improved method for recovery of lead from exhausted lead acid batteries according to claim 3, in which the tetravalent lead Pb (IV) oxide in process step c) is reduced to bivalent lead Pb (II) oxide, which is input into process step b).

* * * * *